April 21, 1942.  A. T. COLWELL  2,280,686
METHOD OF MAKING ENGINE POPPET VALVES
Filed April 6, 1938  3 Sheets-Sheet 1
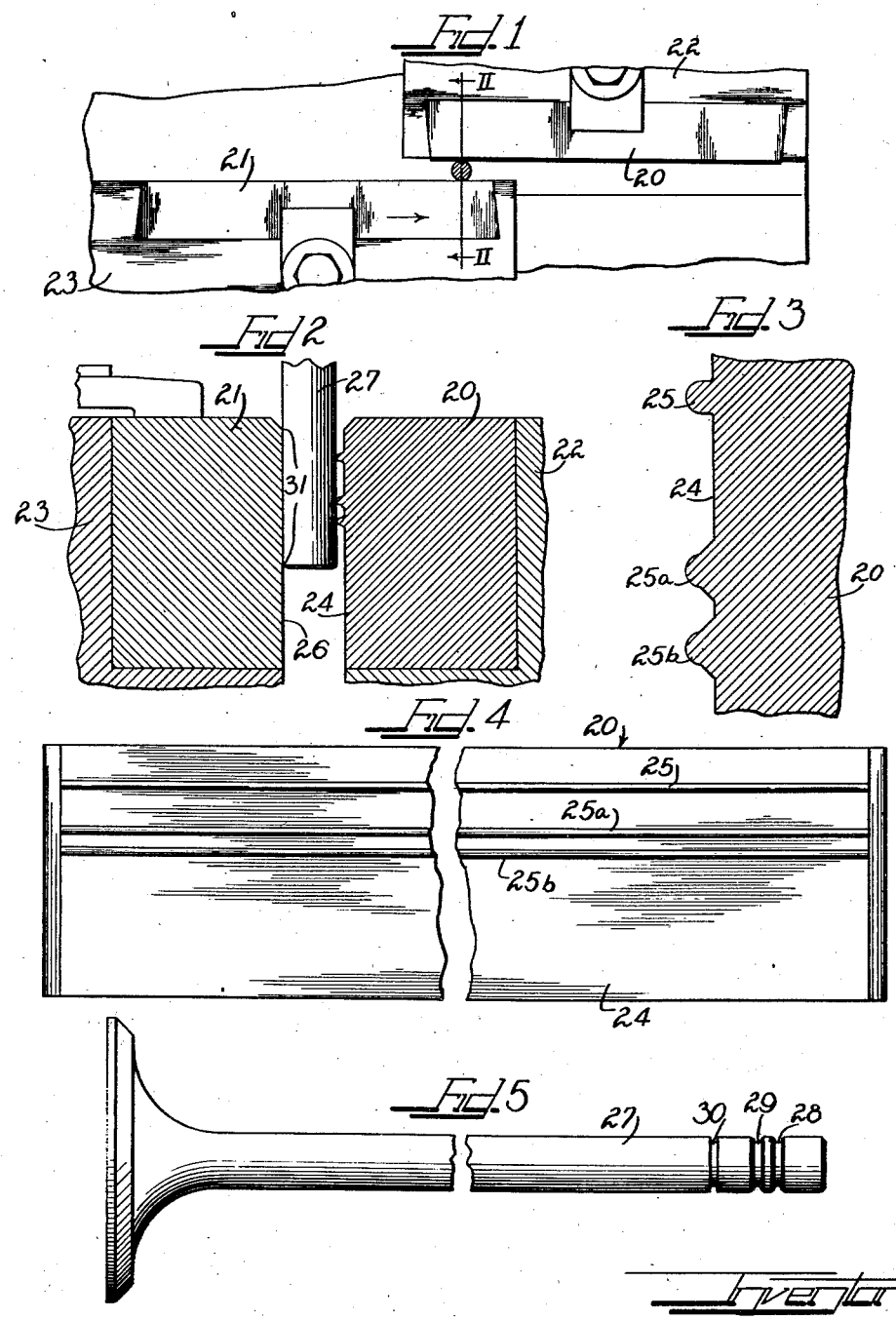
Inventor
ARCHIE T. COLWELL

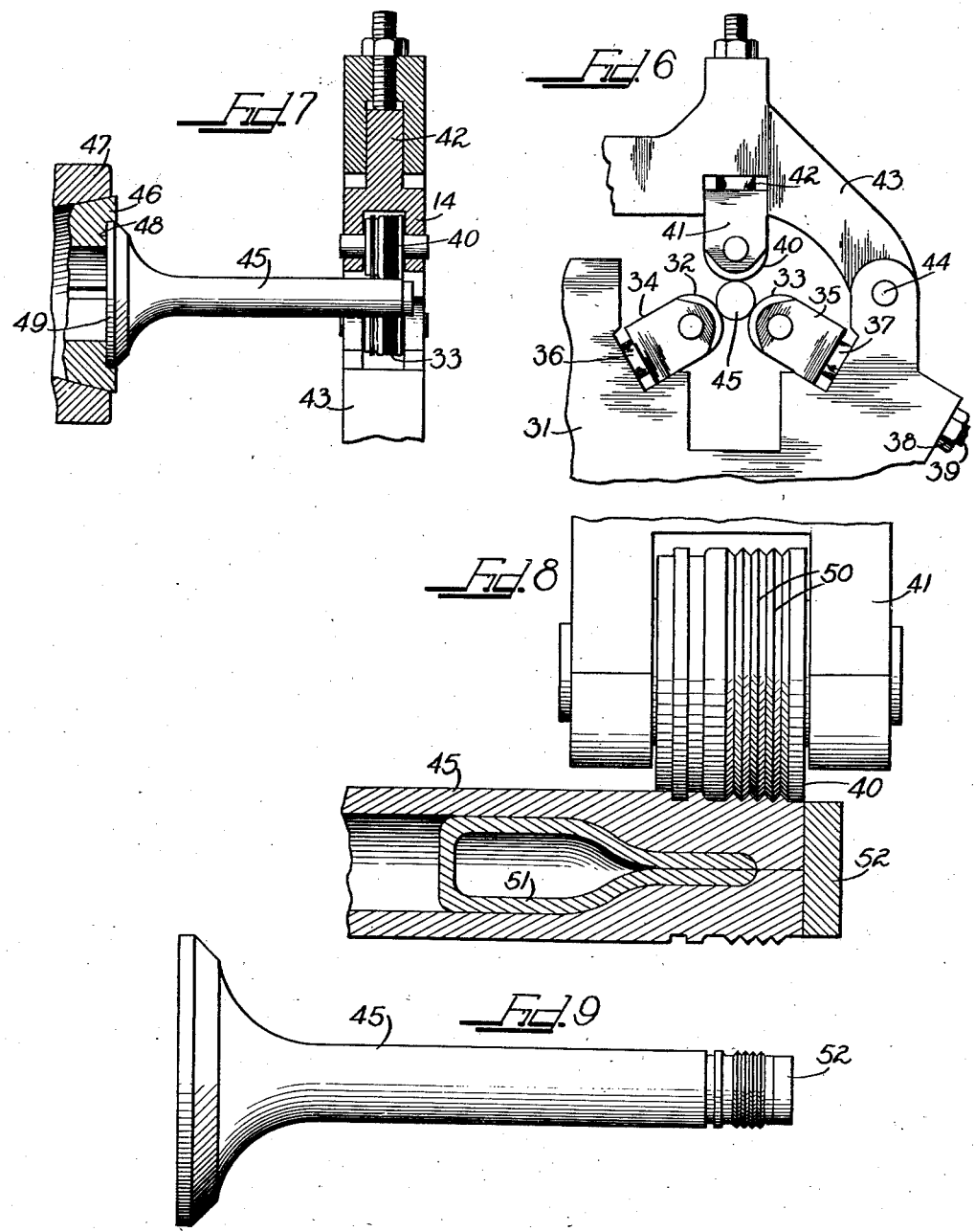

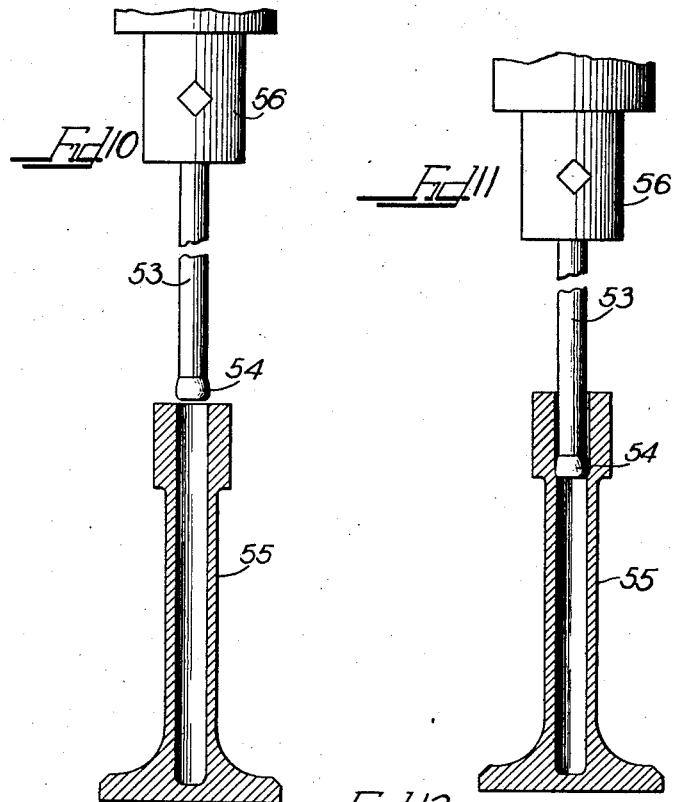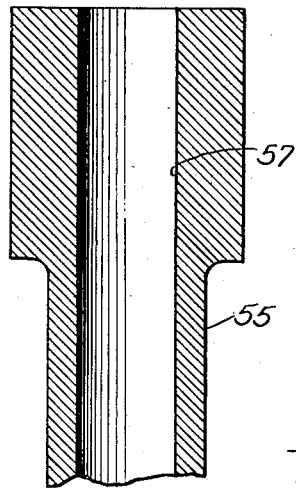

Patented Apr. 21, 1942

2,280,686

UNITED STATES PATENT OFFICE 2,280,686

METHOD OF MAKING ENGINE POPPET VALVES

Archie T. Colwell, Cleveland, Ohio, assignor to Thompson Products, Incorporated, Cleveland, Ohio, a corporation of Ohio Application April 6, 1938, Serial No. 200,310

2 Claims. (Cl. 29—156.7)

This invention relates to a method of making an engine poppet valve. More particularly, the invention relates to a method of increasing the resistance of the metal of a valve stem to fatigue by work hardening a portion of the metal thereof, as by a rolling operation.

In the manufacture of poppet valves for automotive engines of the internal combustion type, such as used in automobiles and aircraft, it is customary to provide one or more grooves in the stem to cooperate with valve spring retainer locks or split collars. These grooves have heretofore been formed by a machining operation.

I have observed, in the case of many valves having machined grooves, that failures occur at the grooves due to fatigue in the metal. Such fatigue is caused by impact forces that occur repeatedly with every lift of the valve and in time starts a crack that goes through the valve stem.

I have now found that if the stem of a valve is work hardened, as by rolling the grooves and adjacent stem surface, the metal of the valve has much greater resistance to fatigue than if the grooves are machined. The grooves may be formed by rolling in a thread rolling machine, by means of three rollers forced against the valve stem as the latter is rotated, or by any other means. The amount of reduction of stem diameter need be only a few thousandths of an inch to increase greatly the resistance of the metal to fatigue.

It is therefore an important object of this invention to provide a method of increasing the fatigue resistance of the metal of an engine poppet valve by a work hardening operation, such as by rolling the surface of the stem of the valve, or by rolling the valve spring retainer lock grooves and the adjacent surface of the stem.

It is a further important object of this invention to provide a valve of increased resistance to fatigue having a work hardened surface adjacent the end of the stem thereof.

It is a further important object of this invention to provide an engine poppet valve of increased resistance to fatigue having a rolled stem and rolled grooves for cooperation with valve spring retainer locks.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary top plan view of a groove rolling machine with a valve stem in position between the rolling dies and in section.

Figure 2 is a fragmentary sectional view taken substantially along the line II—II of Fig. 1 with the valve stem in elevation.

Figure 3 is a fragmentary enlarged sectional view of the male rolling die.

Figure 4 is a broken elevational view of the face of the male rolling die.

Figure 5 is a broken plan view of a finished engine poppet valve after the rolling of the valve spring retainer lock grooves.

Figure 6 is a fragmentary end elevational view of a different type of screw thread rolling machine, illustrating another method of rolling the valve stem to provide grooves therein.

Figure 7 is a fragmentary longitudinal sectional view of the rolling machine of Fig. 6, illustrating the method of holding and rotating the valve, with the valve in elevation.

Figure 8 is an enlarged fragmentary view of one of the rollers of the machine of Fig. 6, with the valve stem in section.

Figure 9 is an elevational view of a finished valve made in accordance with the method illustrated in Figs. 6 to 8 inclusive.

Figure 10 is a fragmentary elevational view of a tool for work hardening the inside of a hollow valve, which is shown in section.

Figure 11 is a view similar to Fig. 10 illustrating the operation.

Figure 12 is an enlarged fragmentary sectional view of the valve stem, illustrating the extent to which the bore thereof has been enlarged by the working operation.

As shown on the drawings:

Figs. 1 to 4 inclusive illustrate one of a number of suitable types of apparatus that may be used in the rolling of valve stems to increase the resistance of the metal of the stem to fatigue. The apparatus shown in these figures is of a construction similar to that of known reciprocating screw thread rolling machines, and includes a pair of dies 20 and 21 secured in holders 22 and 23, respectively. One of said dies, such as the die 20 is stationary and the other die, such as the die 21, is mounted for reciprocating movement. It is considered unnecessary to illustrate the mechanism whereby reciprocation is effected since such mechanism is well known in the art.

The stationary die 20 is provided, on its working face 24, with one or more longitudinally extending groove forming ribs 25, the die illustrated having three such ribs 25, 25a and 25b suitably spaced as required. The working face 26 of the reciprocating die 21 may be smooth, as shown, or may be provided with relief grooves.

In the operation of the machine shown in Figs. 1 to 4, inclusive, the stem 27 of an engine poppet valve is inserted between the working faces 24 and 26 to the desired depth, and the machine set in operation. Under the action of the pressure with which the die faces 24 and 26 are urged relatively toward each other and against the surface of the valve stem 27, the ribs 25, 25a and 25b roll into the surface of said valve stem 27 corresponding grooves 28, 29 and 30 (Fig. 5). Simultaneously with the rolling of the grooves 28, 29 and 30, the portion of the valve stem, represented by the reference numeral 31 is subjected to the rolling action of the plane face 26 of the die 21. The metal of the portion 31 of the valve stem, as well as the metal in the grooves 28, 29 and 30, is thus subjected to the working action of the rolling die.

I have found that by rolling down the groove or stem diameter as much as from 0.003 to 0.007 inch gives very satisfactory results on the usual steel and alloy steel valves used in automobile internal combustion engines. A large number of tests show that the valve steel, as a result of the rolling action, has a much higher resistance against fatigue. For instance, in the case of an engine poppet valve formed of steel of S. A. E. 3140 specifications, the following results were obtained on a Moore fatigue testing machine in the case of such a valve stem with double bead retainer lock grooves:

| Machined grooves | Rolled grooves |
| --- | --- |
| Reversals | Reversals |
| 1 _____ 29,600 | 1 _____ 427,200 |
| 2 _____ 61,800 | 2 _____ 363,400 |
| 3 _____ 16,100 | 3 _____ 430,900 |
| 4 _____ 41,300 | 4 _____ 450,000 |
| 5 _____ 38,100 | 5 _____ 569,800 |
| Av _____ 37,380 | 6 _____ 709,000 |
|  | 7 _____ 493,500 |
|  | Av _____ 492,000 |

The above tests showed that the valve with the rolled grooves withstood 492,000 reversals on the average without any crack or other defect appearing, whereas the valve with the machined grooves withstood only 37,380 reversals before showing a defect caused by fatigue. As a result of similar tests run on an engine block testing machine, also valves made of S. A. E. 3140 steel, it was found that the valves with machined grooves withstood only 50,000 impacts, while the valves with rolled grooves withstood 311,180 impacts, on the average. The increased resistance to fatigue of the valves with rolled grooves, as compared with the valves with the machined grooves, is therefore obvious. This is believed to be due to the work hardening effect resulting from the rolling action, as above described.

In Figs. 6, 7 and 8 there is shown a different type of rolling apparatus, which is also suitable for rolling valve spring retainer lock grooves into the stem of a valve. The reference numeral 31 indicates generally a stationary holder or support for a pair of rollers 32 and 33 which are rotatably mounted in the bifurcated ends 34 and 35 of rods 36 and 37, respectively, that extend through said support 31 and converge toward each other at an angle of 120°. The rods 36 and 37 may be adjusted, as indicated by the nut 38 on the threaded end 39 of the rod 37. A third roller 40, similarly mounted for rotation upon the bifurcated end 41 of a rod 42, is carried by an arm 43 pivoted, as at 44, to said support 31. Means (not shown) are provided for applying pressure through the arm 43 to urge the roller 40 against the stem of a valve 45 positioned between the three rollers 32, 33 and 40.

The valve 45 is supported at its head end by a collet 46 adjustably held in a spindle 47, which in turn is a part of a lathe or other rotatable device (not shown). The collet 46 comprises a pair of tapered members having recessed outer faces 48 for receiving the head end 49 of the valve 45, means (not shown) being provided for tightening the collet to grip said head end 49.

Each of the rolls 32, 33 and 40 is provided with a working face made up of the desired number and configuration of corrugations or ribs 50. The working faces of said rolls 32, 33 and 40, as illustrated in the drawings, are of a configuration suitable for producing the type of grooves required in aircraft poppet valves. In the case of austenitic steel aircraft valves, it has been found satisfactory to roll down the groove or stem diameter about 0.002 inch.

The valve 45, as shown in Fig. 8, may be of the hollow stem type, with a metal capsule 51 secured in the hollow stem adjacent the ends of the stem. A hard tip 52 is shown welded to the ends of the stem of the valve.

Figs. 10, 11 and 12 illustrate the type of tool used and the method of work hardening the inside surface of a hollow valve stem. As shown, a tool 53 having an enlarged, rounded lower end 54 is forced into the stem end of a hollow stem valve 55. The tool 53 is suitably held in a head 56 which may be operated by a hydraulic or arbor press. The head 54 of the tool is forced into the open stem end of the valve 55, preferably for the full length of the bore clear down to the head, enlarging the opening therein to correspond with the size of the head 54 of the tool. It will be understood that tools of progressively greater diameter are used, so that the hole or bore is enlarged by only a small amount each time, say, from 0.001 to 0.002 inch in diameter. The pressures used in forcing the tool into the bore of the hollow stem must be sufficient to distort the metal of the inside surface of the stem. This pressure varies with different steels. I have found that if the bore of the valve stem is enlarged as much as 0.003 inch in diameter, a satisfactory amount of work hardening is effected.

At the completion of the operation, the valve 55 has an enlarged bore portion 57. The end of the valve stem is then closed, as by a swaging operation, to the form shown in Fig. 8, and the desired grooves may be rolled into the outer surface of the valve stem in the manner shown in either Fig. 1 or Fig. 6.

While the hardness of the metal of the valve stem is increased by rolling, the increase is not enough to make a satisfactory tip. The tip is either hardened by heat treatment, or in the case of austenitic steel, a welded tip, such as the tip 52, must be provided. The hardness of the steel does not necessarily indicate increased resistance to fatigue, although work hardening of the inner or outer surface of the valve does, as shown by the foregoing tests, materially increase the resistance of the metal to fatigue.

In the work hardening of either the outer or inner surface of the valve stem in the manner described herein, the work hardening is accomplished by exerting a continuously applied compressive force against successive increments of the surface to be work hardened. The inherent result is that the density of the surface metal undergoing working is increased. This is accomplished, however, with an attendant reduction in the thickness of the body of the metal of only a few thousandths of an inch, as previously pointed out. Consequently, the work hardening operation does not result in any appreciable elongation of the stem of the valve.

There is also another advantage flowing from the use of my invention, and that is the smooth finish obtained by the rolling operation. Such a smooth finish cannot be obtained by machining. As has previously been pointed out, the entire outer surface of the stem, or any desired portion thereof, may be subjected to the rolling action to work harden the same. It is generally satisfactory, however, to work harden the surface of the valve stem throughout the portion only that receives the valve spring retainer lock groove, or surfaces immediately adjacent thereto. It will be understood that grooves need not, and usually will not be completely formed by rolling. It is generally more economical and satisfactory to machine the grooves initially to less than their finished depth and then complete their formation by the rolling operation.

I claim as my invention:

1. In the method of making an engine poppet valve having an annular valve spring retainer lock groove in the metal stem thereof, the steps of increasing the resistance of the metal of said stem to fatigue, which comprise initially machining said groove into said stem to nearly finished depth and finally rolling said groove to a finished depth to work harden the surfaces of said groove and of rolling the outer surface of the adjacent stem portion to work harden said portion.

2. In the method of making an engine poppet valve having an annular valve spring retainer lock groove in the metal stem thereof, the steps of increasing the resistance of the metal of said stem to fatigue, which comprise cutting said groove into said stem to approximate final form and finally progressively rolling said groove to final form and dimensions to work harden and smoothly finish the surfaces of said groove and of rolling the outer surfaces of the adjacent stem portion to work harden said portion.

ARCHIE T. COLWELL.